United States Patent [19]
Thompson et al.

[11] Patent Number: 5,898,748
[45] Date of Patent: Apr. 27, 1999

[54] VACUUM BREAKER VALVE ASSEMBLY

[75] Inventors: Jeffrey L. Thompson, San Jose; Hubert Allen Upton, Morgan Hill, both of Calif.

[73] Assignee: General Electric Company, Schenectady, N.Y.

[21] Appl. No.: 08/901,231

[22] Filed: Jul. 25, 1997

[51] Int. Cl.[6] .................................................. G21C 15/18
[52] U.S. Cl. .......................... 376/283; 376/282; 376/293; 376/299
[58] Field of Search ..................................... 376/283, 293, 376/282, 299; 137/514, 514.5, 554–556, 217–218, 512.3, 512.4

[56] References Cited

U.S. PATENT DOCUMENTS

| | | | |
|---|---|---|---|
| 4,485,843 | 12/1984 | Wolff | 137/514 |
| 4,696,322 | 9/1987 | Knapp et al. | 137/218 |
| 4,976,279 | 12/1990 | King, Sr. et al. | 137/512.3 X |
| 5,007,614 | 4/1991 | Lockwood, Jr. | 137/516.29 X |
| 5,098,646 | 3/1992 | Oosterkamp | 376/283 |
| 5,353,318 | 10/1994 | Gluntz | 376/283 |
| 5,365,971 | 11/1994 | Bergamini | 137/556 |

*Primary Examiner*—Charles T. Jordan
*Assistant Examiner*—M. J. Lattig
*Attorney, Agent, or Firm*—Armstrong Teadale LLP

[57] ABSTRACT

Breaker valve assemblies for a simplified boiling water nuclear reactor are described. The breaker valve assembly, in one form, includes a valve body and a breaker valve. The valve body includes an interior chamber, and an inlet passage extends from the chamber and through an inlet opening to facilitate transporting particles from outside of the valve body to the interior chamber. The breaker valve is positioned in the chamber and is configured to substantially seal the inlet opening. Particularly, the breaker valve includes a disk which is sized to cover the inlet opening. The disk is movably coupled to the valve body and is configured to move substantially concentrically with respect to the valve opening between a first position, where the disk completely covers the inlet opening, and a second position, where the disk does not completely cover the inlet opening.

24 Claims, 1 Drawing Sheet

VACUUM BREAKER VALVE ASSEMBLY

GOVERNMENT RIGHTS STATEMENT

The Government of the United States of America has rights in this invention pursuant to Contract No. DE-AC03-90SF18494 awarded by the U.S. Department of Energy.

FIELD OF THE INVENTION

This invention relates generally to check valves for boiling water nuclear reactors and, more particularly, to vacuum breaker valves for such reactors.

BACKGROUND OF THE INVENTION

In a typical simplified boiling water reactor (SBWR), a vacuum breaker valve is positioned between a drywell and a wetwell to facilitate proper operation of the passive containment cooling system (PCCS) of the reactor. Particularly, a hollow vent pipe extends through the floor of the drywell, and the vacuum breaker valve is coupled to the vent pipe and facilitates transporting particles, e.g., noncondensibles, between the drywell and the wetwell.

Known vacuum breaker valves are designed and tested to comply with various criteria and to demonstrate reliability for all credible events. For example, vacuum breaker valve leak tightness and reliability are important for successful reactor operation. Particularly, such leak tightness and reliability directly affect the pressure difference between the wetwell and the drywell, and the PCCS relies on such pressure difference to operate. More particularly, vacuum breaker valves limit drywell negative pressure, which reduces the possibility that negative drywell pressure might exceed the containment liner negative pressure service limit and substantially prevents the suppression pool water from rising to the level of the spillover holes in the main vents.

Known vacuum breaker valves typically are swing check valves which include a pivot pin pivotally coupled to a breaker valve body with bearings. The pivot pin also is coupled to a disk which is sized to cover one end of the vent pipe. An inlet screen is attached to the vent pipe and substantially prevents debris from flowing from the wetwell and through the vent pipe. In normal operation, the vacuum breakers provide a wetwell to drywell path for inerting nitrogen supplied by the Containment Atmospheric Control System (CACS). In addition, external forces, e.g., gravity, cause the pivot pin to rotate with the disk between a first, or closed, position, where the disk substantially seals one end of the standpipe, and a second, or open, position, where the end of the standpipe is at least partially unsealed. In the sealed position, the disk abuts a valve seal, or seat, which is positioned about a perimeter of the vent pipe, and the disk-seat-pipe connection is substantially leak tight. Gravity and positive drywell to wetwell pressure difference typically cause the disk to rotate to and remain in the closed position. However, if negative pressure difference exceeds a valve lift pressure, which typically is one half pounds per square inch (0.5 psid), then the disk rotates to the open position and enables noncondensibles to pass through the vent pipe between the wetwell and the drywell.

Vacuum breaker valve leakage, or failure to properly close and seal the vent pipe, possibly could result in degradation of heat removal capability during a loss of coolant accident (LOCA), which is undesirable. In addition, such failure to properly close and seal the vent pipe possibly could also cause suppression pool water to rise through the suppression pool vent pipes to the level of the spill over holes and uncover the PCCS vents and create a potential suppression pool bypass path during LOCA, which is undesirable.

Swing check valves, while generally acceptable, may possibly fail to close properly during reactor operation. While moving from the open position to the closed position, the closure force exerted between the disk and the vent pipe reduces, which is undesirable. If the closure force is insufficient, the swing check valve possibly may not close properly. Swing check valves also potentially are vulnerable to valve failure during reactor operation. For example, if debris passes through the inlet screen, such debris may affect the integrity of the breaker valve seat and bearing. In addition, swing check valves tend to chatter at low flow rates, and such chatter sometimes causes unnecessary valve seat and bearing wear, which is undesirable.

It would be desirable to provide a vacuum breaker valve assembly which exerts a more uniform closure force between the disk and the vent pipe and provides an improved seal, as compared to a swing check valve. It further would be desirable to provide such an assembly which is substantially simple to install in a reactor.

SUMMARY OF THE INVENTION

These and other objects may be attained by a breaker valve assembly for a nuclear reactor which, in one embodiment, includes a valve body configured to couple to the drywell and has an interior chamber. An inlet passage extends from the chamber and through an inlet opening to facilitate transporting particles from outside of the valve body to the interior chamber.

A breaker valve is positioned in the chamber and is configured to substantially seal the inlet opening. Particularly, the breaker valve includes a disk which is sized to cover the inlet opening. The disk is movably coupled to the valve body and is configured to move substantially concentrically with respect to the valve opening between a first position, where the disk completely covers the inlet opening, and a second position, where the disk does not completely cover the inlet opening.

In operation, the breaker valve is positioned in a drywell of a nuclear reactor and is coupled to a vent pipe coupling the drywell and the wetwell so that the assembly inlet opening is substantially aligned with a bore extending through the pipe and in communication with the wetwell. During normal reactor operation, a positive pressure, i.e., gravity forces, is exerted between the drywell and wetwell and positions the disk in the first position. The disk blocks particles from transferring between the drywell and the wetwell. When a negative pressure develops between the drywell and the wetwell, however, the disk moves to the second position, and enables particles to flow between the wetwell and the drywell.

The above described breaker assembly is believed to provide an improved seal, as compared to a swing check valve, between the drywell and the wetwell. Such breaker assembly also is believed to be substantially simple to install in the reactor.

DETAILED DESCRIPTION

Figure 1:
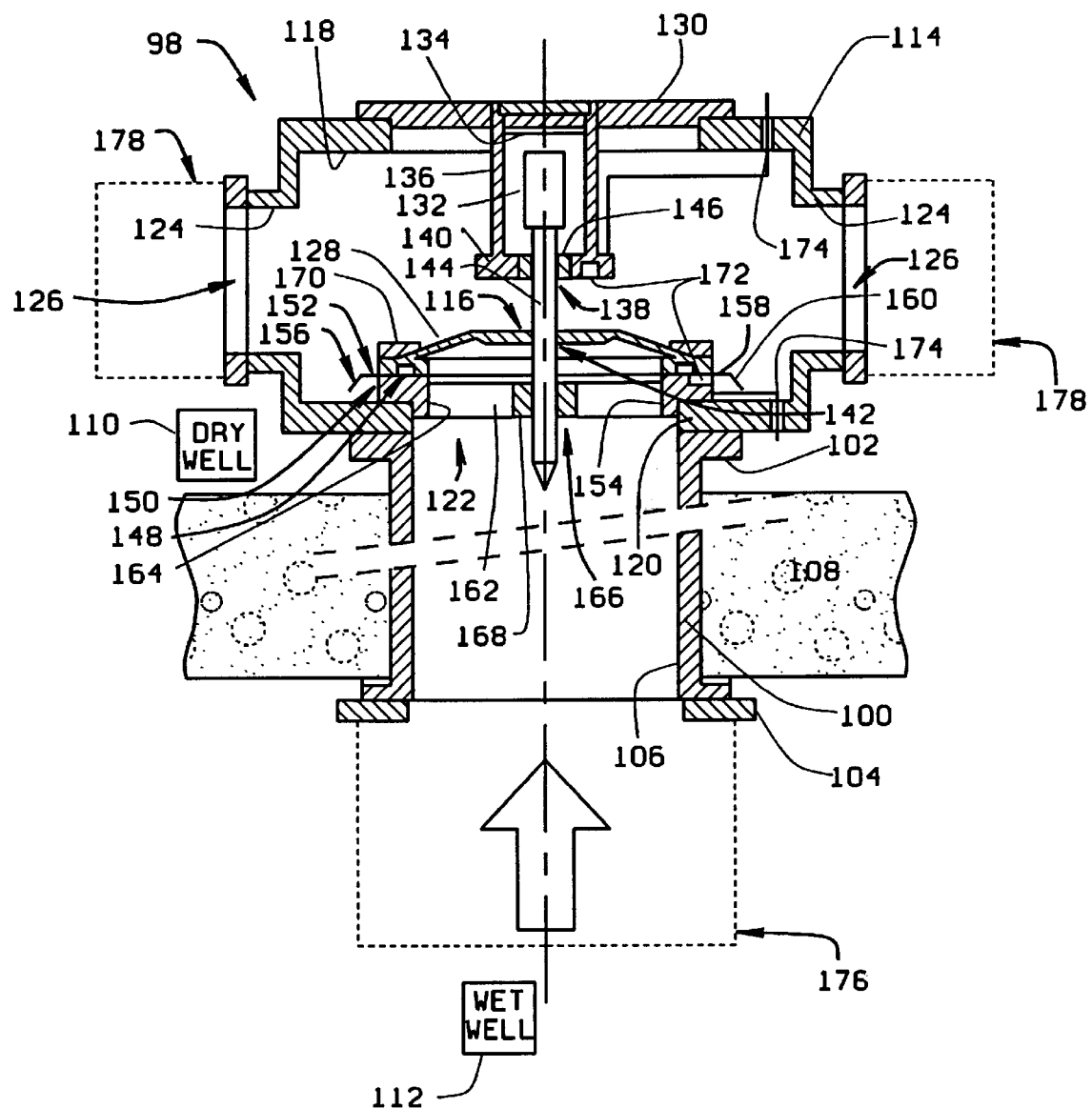
FIG. 1 is a schematic cross-section illustration of a breaker valve assembly coupled to a standpipe in accordance with one embodiment of the present invention.

FIG. 1 is a schematic cross-section illustration of an exemplary breaker valve assembly 98 coupled to a standpipe 100 in accordance with one embodiment of the present invention. Standpipe 100 includes a flanged first end 102 and a flanged second end 104, and a tubular bore 106 extends between ends 102 and 104, respectively. Standpipe 100 extends through a drywell floor 108 which separates a drywell 110 from a wetwell 112, and facilitates transporting particles, e.g., water, vapor, and noncondensibles, between wetwell 112 and drywell 110. Drywells, wetwells and standpipes are well known.

Breaker valve assembly 98 includes a valve body 114 and a breaker valve 116. Valve body 114 is configured to couple to drywell 110 and includes an interior chamber 118. An inlet passage 120 extends from chamber 118 and through an inlet opening 122 to facilitate transporting particles between a location outside of valve body 114 and interior chamber 118. Several outlet passages 124 (only two outlet passages 124 are shown in FIG. 1) also extend from chamber 118 and through respective outlet openings 126 (only two outlet openings 126 are shown in FIG. 1) to facilitate transporting particles between a location outside of valve body 114 and interior chamber 118.

Breaker valve 116 is positioned within interior chamber 118 and coupled to valve body 114. Breaker valve 116 is configured to substantially seal inlet opening 122 and includes a substantially concave sealing disk 128, or poppet disk, sized to cover inlet opening 122. Sealing disk 128 is substantially aligned with inlet opening 122 and is configured to move substantially concentrically with respect to inlet opening 122 between a first position, where sealing disk 128 completely covers inlet opening 122 (shown in FIG. 1), and a second position, where sealing disk 128 does not completely cover inlet opening 122 (not shown in FIG. 1).

More particularly, a bonnet 130 is coupled to valve body 114, and sealing disk 128 is coupled to bonnet 130. A damper 132 is movably coupled to bonnet 130 via a damper thrust support 134 and is positioned within a damper cage 136. Damper cage 136 includes an opening 138 adjacent a first end 140, and opening 138 is substantially aligned with an opening 142 in sealing disk 128. A shaft 144, or stem, is coupled to damper 132 and extends through openings 138 and 142, respectively. A first bearing 146, or upper bearing, is coupled to a perimeter of cage opening 138 to facilitate movement of shaft 144 through cage opening 138 with respect to cage 136. First bearing 146 may, for example, be a vertical bearing to facilitate movement of shaft 144 through cage opening 138 without supporting any weight of shaft 144 and sealing disk 128. Shaft 144 is fixedly coupled to sealing disk 128 so that shaft 144 does not move relative to disk 128.

Breaker valve assembly 98 further includes a first seal 148 and a second seal, or seal set, 150 to facilitate sealing inlet opening 122. First seal 148 is coupled to a lower end 152 of sealing disk 128, and is configured to couple to second seal 150. Second seal 150 is coupled to valve body 114 includes a flange 154 which extends at least partially through inlet opening 122. Flange 154 abuts a perimeter of inlet opening 122 and forms a substantially leak tight seal with valve body 114 about the perimeter of opening 122. First seal 148 may, for example, be a substantially soft seal fabricated from radiation resistant elastomer material, e.g., rubber. Second seal 150 may, for example, be a substantially hard seal and fabricated from polished steel. In accordance with one embodiment, first seal 148 has a maximum allowable leak area of 0.02 square centimeters and second seal 150 has a maximum allowable leak area of 0.2 square centimeters.

An anti-chatter ring 156 is coupled to lower end 152 of sealing disk 128 to substantially prevent valve chatter. Anti-chatter ring 156 extends from an outer perimeter of sealing disk 128 and is configured to substantially ensure that the pressure required to move sealing disk 128 to the first position, i.e., the seating pressure, is significantly lower than the pressure required to move sealing disk 128 to the second position, i.e., the lifting pressure. Particularly, anti-chatter ring 156 includes a substantially planar back portion 158 and an end portion 160 extending generally downwardly therefrom. Accordingly, anti-chatter 156 ring deflects flow of liquid and particles within interior chamber 118 downward to create lift force that softens sealing disk-to-second seal impact and provides damping by energy absorption.

A stabilizing ring 162 is coupled to an inner perimeter 164 of seal seat 150 and includes an opening 166. A second bearing 168, or lower bearing, is coupled to a perimeter of opening 166 and facilitates movement of shaft 144 through opening 166 with respect to stabilizing ring 162. Second bearing 168 includes an anti-rotation element (not shown), e.g., an anti-rotation key, which couples to shaft 144 and substantially prevents shaft 144 from rotating with respect to stabilizing ring 162. For example, second bearing 168 may include an anti-rotation key which extends into substantially vertical channel in shaft 144 to substantially prevent shaft 144 from rotating with respect to stabilizing ring 162. Second bearing 168 may, for example, be a vertical bearing to facilitate movement of shaft 144 through opening 166 without supporting any weight of shaft 144 and sealing disk 128.

Breaker valve assembly 98 further includes ballast weight 170 and several position sensors, or proximity probes, 172 (only two position sensors 172, e.g., an upper position sensor and a lower position sensor, are shown in FIG. 1). Ballast weight 170 is coupled to sealing disk 128 and facilitates sealing inlet opening 122 when sealing disk 128 is in the first position. In accordance with one embodiment, and for example, four lower position sensors 172 are coupled to seal seat 150. Of course, either fewer than four or more than four lower position sensors 172 may be utilized. Position sensors 172 are coupled to respective cable penetrations 174 which extend through valve body 114. Position sensors 172 are configured to detect displacement deviation between sealing disk 128 and second seal 150 and to transmit signals representative of detected displacement deviation to a workstation (not shown in FIG. 1) via cable penetrations 174.

Breaker valve assembly 98 also includes an inlet shield 176 for substantially preventing large particles from entering interior chamber 118 through inlet opening 122. Particularly, inlet shield 176 is a perforated stainless steel sheet and the perforations (not shown in FIG. 1) are sized to prevent the entrance of particles large enough to create leakage through breaker valve 116 if the particles were to impact either first seal 148 or second seal 150. Inlet shield 176, in one embodiment, is positioned in wetwell 112 and is coupled to standpipe 100 so that inlet shield 176 substantially covers second end 104 of standpipe 100.

Breaker valve assembly 98 also includes outlet shields 178 (only two outlet shields are shown in FIG. 1) for substantially preventing large particles from entering interior chamber 118 through respective outlet openings 126. Each outlet shield 178 is a perforated stainless steel sheet and the perforations (not shown in FIG. 1) are sized to prevent the entrance of particles large enough to create leakage through breaker valve 116 if the particles were to impact either first seal 148 or second seal 150. Each outlet shield 178 is coupled to valve body 114 so that outlet shields 178 substantially cover respective outlet openings 126.

In operation, valve body 114 is positioned in drywell 110 and coupled to first end 102 of standpipe 100 so that inlet opening 122 is substantially aligned with standpipe bore 106. Inlet shield 176 is coupled to second end 104 of standpipe 100 and outlet shields 178 are coupled to valve body 114 to substantially cover outlet openings 126.

During normal reactor operation, a positive pressure differential exists between drywell 110 and wetwell 112. Both the positive pressure differential and gravity exert a force on sealing disk 128 and move sealing disk 128 to the first position. When in the first position, as explained above, sealing disk 128 substantially prevents particles from transferring through standpipe 100 between drywell 110 and wetwell 112. First and second seals 148 and 150 substantially protect breaker valve assembly 98 from obstructions that could lodge on either seat without exceeding allowable leakage. For example, even if a particle impacts hard seal 150, soft seal 148 remains coupled to between sealing disk 128 and standpipe 100 and substantially prevents leakage. Alternatively, if a particle impacts soft seal 148, then soft seal 148 deforms around the particle and maintains leak tightness.

When moving disk 128 to the first position, the force exerted on sealing disk 128 is applied throughout the stroke and is believed to provide more positive seating against second seal 150 than afforded by a swing check valve. Moreover, the force is applied substantially uniformly over the perimeter of sealing disk 128 and second seal 150, and is believed to provide an improved seal as compared to a swing check valve. In addition, and because first and second bearings 146 and 168, respectively, are substantially vertical and do not support the weight of sealing disk 128, bearing drag is believed to be reduced as compared to a swing check valve.

If negative pressure develops between drywell 110 and wetwell 112, sealing disk 128 moves to the second position and enables particles to flow between wetwell 110 and drywell 112 through standpipe 100. Particularly, when a negative pressure vacuum develops between drywell 110 and wetwell 112, a force exerted on sealing disk 128 is applied throughout the stroke to lift sealing disk 128 off second seal 150.

The above described breaker assembly is believed to provide an improved seal, as compared to a swing check valve, between the drywell and the wetwell. Such breaker assembly also is believed to be substantially simple to install in a nuclear reactor.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, while the sealing disk described in connection with the breaker valve assembly is substantially concave, the sealing disk may have other shapes, e.g., substantially planar or substantially convex. Similarly, while the breaker valve assembly included two outlet openings, the breaker valve assembly may include either fewer or more than two outlet openings. Accordingly, the spirit and scope of the invention are to be limited only by the terms of the appended claims.

We claim:

1. A breaker valve assembly for a nuclear reactor, said breaker valve assembly comprising:

a valve body having at least one inlet opening in communication with a chamber therein;

a breaker valve positioned in said chamber and configured to substantially seal said inlet opening, wherein said breaker valve is not a swing check valve;

a sealing disk sized to cover said inlet opening; and an anti-chatter ring extending from a perimeter of said sealing disk.

2. A breaker valve assembly in accordance with claim 1 wherein said breaker valve further comprises two seals for sealing said inlet opening.

3. A breaker valve assembly in accordance with claim 2 wherein one of said seals comprises a hard seal.

4. A breaker valve assembly in accordance with claim 2 wherein one of said seals comprises a soft seal.

5. A breaker valve assembly in accordance with claim 3 further comprising at least one disk position sensor coupled to one of said seals.

6. A breaker valve assembly in accordance with claim 1 further comprising a perforated shield, said shield coupled to said valve body and substantially covering said inlet opening.

7. A breaker valve assembly in accordance with claim 1 wherein said valve body further comprises at least one outlet opening, each said outlet opening in communication with said valve body chamber.

8. A breaker valve assembly for a nuclear reactor, the reactor including a drywell, a wetwell, and a standpipe extending through the drywell and providing communication between the drywell and the wetwell, the standpipe having a first end and a second end and a bore extending between the first and second ends, said breaker valve assembly comprising:

a valve body having at least one inlet opening in communication with a chamber therein, said valve body configured to couple to said standpipe so that said inlet opening is aligned with said standpipe bore;

a breaker valve positioned in said chamber and configured to substantially seal said inlet opening, wherein said breaker valve is not a swing check valve;

a sealing disk sized to cover said inlet opening; and an anti-chatter ring extending from a perimeter of said sealing disk.

9. A breaker valve assembly in accordance with claim 8 wherein said breaker valve is coupled to said valve body and configured to move substantially concentrically with respect to said inlet opening.

10. A breaker valve assembly in accordance with claim 8 wherein said breaker valve further comprises two seals for sealing said inlet opening.

11. A breaker valve assembly in accordance with claim 10 wherein one of said seals comprises a hard seal.

12. A breaker valve assembly in accordance with claim 10 wherein one of said seals comprises a soft seal.

13. A breaker valve assembly in accordance with claim 10 further comprising at least one disk position sensor coupled to one of said seals.

14. A breaker valve assembly in accordance with claim 8 further comprising a perforated shield, said shield coupled to said valve body and substantially covering said inlet opening.

15. A breaker valve assembly in accordance with claim 8 wherein said valve body further comprises at least one outlet opening, each said outlet opening in communication with said valve body chamber.

16. A vent pipe assembly for a nuclear reactor, the reactor including a drywell and a wetwell, said vent pipe assembly comprising:

a standpipe having a bore therethrough and configured to extend through the drywell and into the wetwell to provide communication between the drywell and wetwell; and a breaker valve assembly comprising a valve body having at least one inlet opening in communication with a chamber therein, a breaker valve positioned in said chamber and configured to substantially seal said inlet opening, wherein said breaker valve is not a swing check valve, a sealing disk sized to cover said inlet opening, and an anti-chatter ring extending from a perimeter of said sealing disk.

17. A vent pipe assembly in accordance with claim 16 wherein said breaker valve further comprises two seals for sealing said inlet opening.

18. A vent pipe assembly in accordance with claim 16 wherein said breaker valve is coupled to said valve body and configured to move substantially concentrically with respect to said inlet opening.

19. A vent pipe assembly in accordance with claim 16 wherein said breaker valve further comprises two seals for sealing said inlet opening.

20. A vent pipe assembly in accordance with claim 19 wherein one of said seals comprises a hard seal.

21. A vent pipe assembly in accordance with claim 19 wherein one of said seals comprises a soft seal.

22. A vent pipe assembly in accordance with claim 19 further comprising at least one disk position sensor coupled to one of said seals.

23. A vent pipe assembly in accordance with claim 16 further comprising a perforated shield, said shield coupled to said valve body and substantially covering said inlet opening.

24. A vent pipe assembly in accordance with claim 16 wherein said valve body further comprises at least one outlet opening, each said outlet opening in communication with said valve body chamber.

* * * * *